Oct. 19, 1965   D. E. BLOK   3,212,223
STRUCTURAL ELEMENT AND A SECURING MEMBER FOR SUCH ELEMENT
Filed April 12, 1962   2 Sheets-Sheet 2
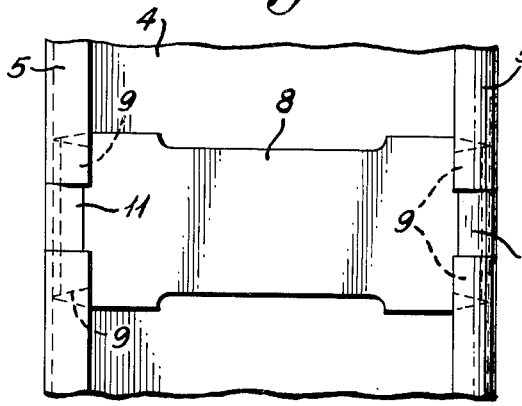
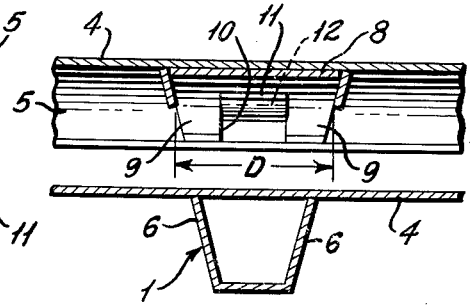
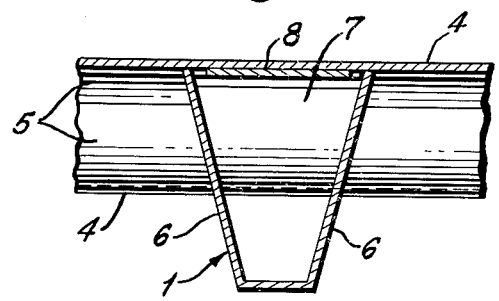
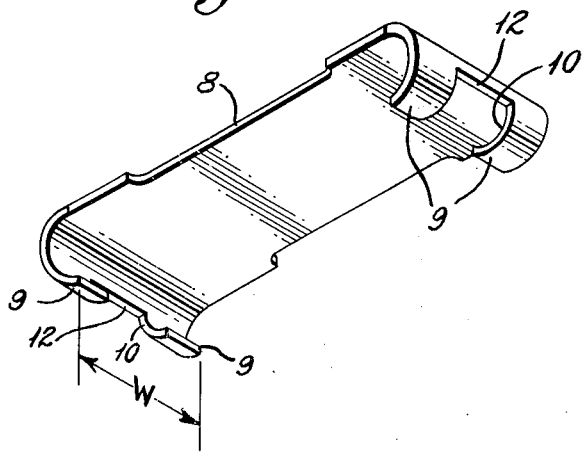
INVENTOR
Dirk Evert Blok
BY Stevens, Davis, Miller & Mosher
ATTORNEYS

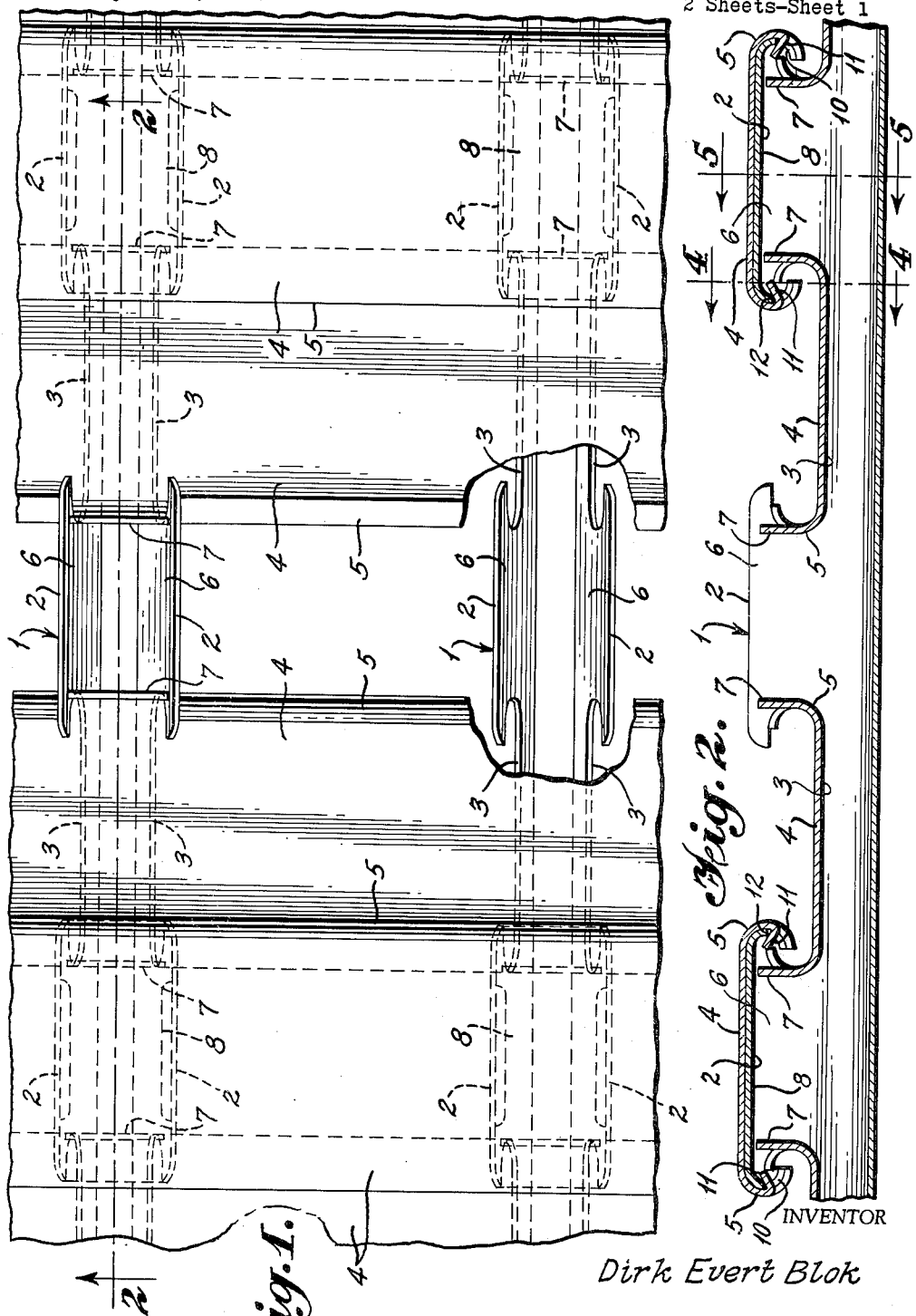

United States Patent Office 3,212,223
Patented Oct. 19, 1965

3,212,223
STRUCTURAL ELEMENT AND A SECURING MEMBER FOR SUCH ELEMENT
Dirk Evert Blok, Zwijndrecht, Netherlands, assignor to Hunter Douglas International (Quebec) Limited, Montreal, Quebec, Canada, a corporation of Canada
Filed Apr. 12, 1962, Ser. No. 187,033
Claims priority, application Netherlands, Apr. 14, 1961, 263,612
3 Claims. (Cl. 52—478)

This invention relates to a structural element having profiled metal panel elements with bent-down edges which are clamped on to projecting parts and in recesses of profiled stringers. A structural element of this kind is particularly adapted for use as a wall, partition, panel, lining plate for walls, roofings, etc. The invention similarly relates to a securing member for such structural element.

In such structural elements there is a risk that the panel elements will slip in the stringers. This risk is increased by the fact that the panel elements are exposed to changes in temperature, so that they expand when heated and contract again when cooled. As a result the panel elements shift in position, and it depends upon the forces exerted thereon by the stringers whether they will revert to their initial positions. As a rule, however, they do not do so and consequently the ends of the panel elements are no longer aligned, so that the structure makes an untidy impression.

The object of the invention is to obviate this difficulty, which is achieved in the structural element according to the invention by the fact that each of the panel elements clamped around projecting parts of the stringers is provided with a securing member positioned between the profiles of the stringer, which securing member is fixed into the panel element concerned. The panel elements fixed in the recesses of the stringers can be secured against displacement, e.g. by deforming a part situated at a point on at least one stringer. The deforming of the edges of the panel elements situated in the recesses of the stringers does not entail any difficulty, since these edges are freely accessible when the panel elements are mounted in the recesses of the stringer. The edges of the panel elements clamped around projecting parts of the stringers, are, however, inaccessible, as they are turned towards the elements that are clamped into the recesses of the stringers. It is consequently necessary that before being placed in position the panel elements which engage around the projecting parts of the stringers should be provided with securing members which are immovable in the said panel elements. These securing members are situated at the position of at least one stringer and come to lie between the limbs of the profiled stringer, which has preferably a U or a V profile. The panel elements are free to expand or contract on either side of the securing members, so that they always remain in position.

According to the invention the securing member may have a cross-section that is the same or approximately the same as the longitudinal section of the panel elements, the bent-down edges of the securing member having one or more recesses in which a part of the panel element is fixed.

It is evident that the securing member according to the invention may have different shapes. One advantageous embodiment of the securing member according to the invention is characterized in that it consists of a strip with bent-down edges the ends of which have one or more recesses.

The invention will be described below with reference to the accompanying drawings showing by way of example an embodiment of the structural element and of the securing member.

FIG. 1 shows a front view of the structural element in which one of the panel elements that engage around the projecting parts of the stringers has been removed.

FIG. 2 is a section on the line II—II of FIG. 1.

FIG. 3 shows a bottom plan view of the panel element which is removed in FIG. 1.

FIGURE 4 is a sectional view taken along line 4—4 of FIGURE 2;

FIGURE 5 is a sectional view taken along line 5—5 of FIGURE 2; and,

FIGURE 6 is an isometric view of a securing member according to the present invention.

The structural element represented in FIGS. 1 and 2 has two stringers 1 with a U-shaped profile (when viewed in a plane transversely of FIGURE 2) which are provided with a number of projecting parts 2 and recesses 3. The projecting parts 2 are constituted by spaced-apart upstanding flanges 6, the inner walls of which are separated by space D. Space D is not a constant value but is a changing value since the inner walls of flanges 6 are inclined towards each other as is seen in FIGURE 4. The projecting parts and recesses are so profiled (as seen in FIGURE 2) that panel elements of correspondingly profiled metal fit securely around the projecting parts and into the recesses. As a result these profiled panel elements are alternately positioned with their outer side and their inner side towards the outer side of the structural element. As can be seen from the drawings, the panel elements 4, which are preferably of aluminium have bent-down edges 5.

When this structural element is being assembled the panel elements 4 are first pressed into the recesses 3. This can be done, as the elements 4 are resilient. After they have been pressed into the recesses 3 they are securely held in position. They can, however, be shifted in a longitudinal direction, e.g. by shocks or impacts, by variations in length due to changes in temperature, etc. In order to prevent such shifting, the edge portions of the panel elements which are situated between the flanges 6 of a stringer 1 in at least one of the stringers are bent outwardly so as to form lips 7, which have a breadth equal to the distance between the flanges 6, thereby preventing the shifting of these elements in the longitudinal direction.

When the panel elements 4 have been placed around the projecting parts 2 of the stringers 1 in the manner shown in FIG. 2, the ends of the bent edges are no longer within easy access, as they grip partly around the bent edges of the panel elements 4 which are situated in the recesses 3. In order to permit secure fixing also of the panel elements that engage around the projecting members 2, a securing member 8, such as that shown in FIGURE 6, is fitted into these panel elements. This securing member possesses the shape of a clip and is made of a strip of metal the ends of which are bent down in such a way that its longitudinal profile is the same or approximately the same as the cross-section or profile of a panel element 4. This securing member has four projecting curved lips 9. The distance W between the outer edges of the lips 9 is preferably tapered and is slightly smaller than the tapering distance D between the inner walls of projecting flanges 6 so that securing member 8 can snugly be received between said inner walls, as is seen in FIGURE 4. A recessed edge 12 at the bottom of recess 10 extends between lips 9, at each end of member 8, and is securely gripped by bent lip 11 which is formed in each curved side edge 5 of panel member 4. In this way the securing member is immovably joined to this panel element 4. In order to place this panel element in position it is merely necessary to hook one of its edges 5 around one end of the projecting parts 2 and, by exerting pressure upon the panel element 4, to bring the other edge 5 into position around these projecting parts 2.

It is evident that the invention is not restricted to the embodiment described in the foregoing and reproduced in the drawings, but that the structural element can be varied in numerous ways without departing from the scope of the invention. As an alternative to panel elements of aluminium, it is also possible to use panel elements of other metal, of plastic or of other suitable material.

For the formation of the lips 7 and 11 a tool may be used by means of which short notches are made in the edges 5 prior to bending down the lips with this tool.

The correct positioning of the elements 4 around the projecting parts 2 of the stringers 1 is facilitated by the fact that the recesses 10 of the securing members 8 are bounded by lips that can be introduced into the space between the flanges of the stringers 1. After this the elements 4 are turned into such a point that they come to lie at the other end of the projecting members 2, whereupon the bent-down side edges are pressed over the ends of these projecting parts. The lips adjacent to the recesses 10 are preferably bevelled on their outer side, so that the securing members are guided during turning of the elements 4.

I claim:

1. A structural element such as a wall, comprising panel elements which are channel-shaped in cross-section and have a substantially planar base portion and arcuately inturned side walls, said panel elements being respectively clamped over projecting flanges and nested within longitudinally adjacent, undercut recesses of channel-shaped stringers, said stringers being disposed transversely with respect to said panel elements, each of the panel elements which are clamped over the projecting flanges being provided with at least one securing member which is non-slidable relative to said panel elements, said securing member being positioned and projecting between the spaced flanges of said stringers whereby said panel elements which are clamped over the projecting flanges are non-slidable relative to said stringers.

2. The structural element of claim 1, wherein said securing member comprises a clip fitted between said arcuately inturned side walls of a panel element which is clamped over said projecting flanges, said clip including curved lips and having a longitudinal profile which substantially corresponds to the panel element cross-section, said lips having at least one recessed edge therebetween, a portion of the panel element arcuately inturned sidewalls being bent over said recessed edge and thereby securing said securing member to said panel element.

3. The structural element of claim 2, wherein said clip is a strip of metal.

References Cited by the Examiner

FOREIGN PATENTS 214,929   5/58   Australia.

RICHARD W. COOKE, JR., *Primary Examiner.*

JACOB L. NACKENOFF, *Examiner.*